US011689048B1

(12) United States Patent
LaBach

(10) Patent No.: US 11,689,048 B1
(45) Date of Patent: Jun. 27, 2023

(54) METHODS, SYSTEMS, AND DEVICES FOR MAINTENANCE AND OPTIMIZATION OF BATTERY CABINETS

(71) Applicant: NDSL, Inc., Durham, NC (US)

(72) Inventor: Frederick Avery LaBach, Raleigh, NC (US)

(73) Assignee: NDSL, Inc., Durham, NC (US)

( * ) Notice: Subject to any disclaimer, the term of this patent is extended or adjusted under 35 U.S.C. 154(b) by 0 days.

(21) Appl. No.: 17/547,311

(22) Filed: Dec. 10, 2021

(51) Int. Cl.
*H02J 9/06* (2006.01)
*H02J 7/00* (2006.01)

(52) U.S. Cl.
CPC .............. *H02J 9/062* (2013.01); *H02J 7/005* (2020.01); *H02J 7/0013* (2013.01); *H02J 7/0048* (2020.01)

(58) Field of Classification Search
CPC .......... H02J 9/062; H02J 7/0048; H02J 7/005; H02J 7/0013
USPC ...................................................... 307/64, 66
See application file for complete search history.

(56) References Cited

U.S. PATENT DOCUMENTS

| | | | |
|---|---|---|---|
| 5,710,501 A | 1/1998 | van Phuoc et al. | |
| 5,808,445 A | 9/1998 | Aylor et al. | |
| 5,955,869 A | 9/1999 | Rathmann | |
| 7,570,012 B2 | 8/2009 | Dasgupta et al. | |
| 9,385,543 B2 | 7/2016 | Kachi | |
| 9,847,654 B2 | 12/2017 | Beaston | |
| 9,944,199 B2 | 4/2018 | Tahara | |
| 10,270,071 B2 | 4/2019 | Wang et al. | |
| 10,401,436 B2 | 9/2019 | Young et al. | |
| 10,454,286 B2 | 10/2019 | Torkestani et al. | |
| 10,684,329 B2 | 6/2020 | Gajewski et al. | |
| 10,737,578 B2 | 8/2020 | Thieme et al. | |
| 10,944,279 B1 | 3/2021 | Chen et al. | |
| 11,271,249 B2 | 3/2022 | Yi et al. | |

(Continued)

FOREIGN PATENT DOCUMENTS

| | | |
|---|---|---|
| CN | 101719557 A | 6/2010 |
| CN | 102270878 A | 12/2011 |

(Continued)

OTHER PUBLICATIONS

Varnosfaderani, M. A. et al.: "Online impedance spectroscopy estimation of a battery", IEEE, Oct. 27, 2016, pp. 1-10.

(Continued)

*Primary Examiner* — Michael R. Fin
(74) *Attorney, Agent, or Firm* — NK Patent Law

(57) ABSTRACT

Disclosed herein are methods, systems, and devices for supporting the transition to lithium-ion batteries and leveraging the value that lithium-ion batteries offer in double conversion uninterruptible power supply (UPS) applications. According to one embodiment, a UPS system includes an alternating current (AC) to direct current (DC) rectifier configured to be electrically coupled with an AC source, a DC to AC inverter configured to be electrically coupled with an AC load, a DC bus electrically coupled between the AC to DC rectifier and the DC to AC inverter. The UPS system also includes a diode electrically coupled between the DC bus and a first battery cell of a plurality of battery cells, and a by-pass relay having a first terminal electrically coupled with an anode of the diode and a second terminal electrically coupled with a cathode of the diode.

16 Claims, 12 Drawing Sheets

(56) References Cited

U.S. PATENT DOCUMENTS

| | | |
|---|---|---|
| 2003/0154040 A1 | 8/2003 | Nann et al. |
| 2009/0027056 A1 | 1/2009 | Huang et al. |
| 2009/0317696 A1 | 12/2009 | Chang |
| 2013/0051104 A1 | 2/2013 | Nakano et al. |
| 2013/0257382 A1 | 10/2013 | Field et al. |
| 2014/0269811 A1 | 9/2014 | Maleki et al. |
| 2014/0306712 A1 | 10/2014 | Esnard-Domerego |
| 2015/0050527 A1 | 2/2015 | Jiang et al. |
| 2016/0099598 A1 | 4/2016 | Gray |
| 2016/0134160 A1* | 5/2016 | Schultz ............... H02J 9/04 307/77 |
| 2016/0352144 A1* | 12/2016 | Shelton .............. H02J 9/062 |
| 2017/0317510 A1 | 11/2017 | Banerjee et al. |
| 2019/0113577 A1 | 4/2019 | Severson et al. |
| 2020/0195040 A1 | 6/2020 | Patel et al. |
| 2021/0168964 A1 | 6/2021 | Nakaya |
| 2021/0380013 A1 | 12/2021 | Moszynski et al. |

FOREIGN PATENT DOCUMENTS

| | | |
|---|---|---|
| CN | 202712883 U | 1/2013 |
| CN | 104242438 A | 12/2014 |
| CN | 204068399 U | 12/2014 |
| CN | 204179729 U | 2/2015 |
| CN | 205509569 U | 8/2016 |
| CN | 209169935 U | 7/2019 |
| CN | 110112804 A | 8/2019 |
| CN | 110445243 A | 11/2019 |
| CN | 210137209 U | 3/2020 |
| CN | 111596218 A | 8/2020 |
| CN | 112134305 A | 12/2020 |
| CN | 112186860 A | 1/2021 |
| CN | 112332528 A | 2/2021 |
| DE | 102011108231 A1 | 10/2012 |
| DE | 102012007575 B3 | 10/2013 |
| EP | 1855344 B1 | 8/2011 |
| FR | 2980274 B1 | 6/2014 |
| GB | 2583510 A | 11/2020 |
| JP | 3877430 B2 | 2/2007 |
| JP | 2013092398 A | 5/2013 |
| JP | 5914551 B2 | 5/2016 |
| JP | 2017117797 A | 6/2017 |
| JP | 2019133939 A | 8/2019 |
| JP | 2020529022 A | 10/2020 |
| KR | 20140016750 A | 2/2014 |
| KR | 20190064117 A | 6/2019 |
| RU | 2377589 C2 | 12/2009 |
| WO | 2010091583 A1 | 8/2010 |
| WO | 2013176379 A1 | 11/2013 |
| WO | 2014075587 A1 | 5/2014 |
| WO | 2018083332 A1 | 5/2018 |
| WO | 2018231573 A1 | 12/2018 |

OTHER PUBLICATIONS

Rivera-Barrera, J. P. et al.: "SoC Estimation for Lithium-ion Batteries: Review and Future Challenges", Electronics, Nov. 23, 2017, vol. 6, Issue 102, pp. 1-33.

USPTO, Final Office Action for corresponding U.S. Appl. No. 17/547,335, dated Jun. 7, 2022, 12 pages.

USPTO; Non-Final Action for U.S. Appl. No. 17/547,335 dated Mar. 15, 2022, 11 pages.

* cited by examiner

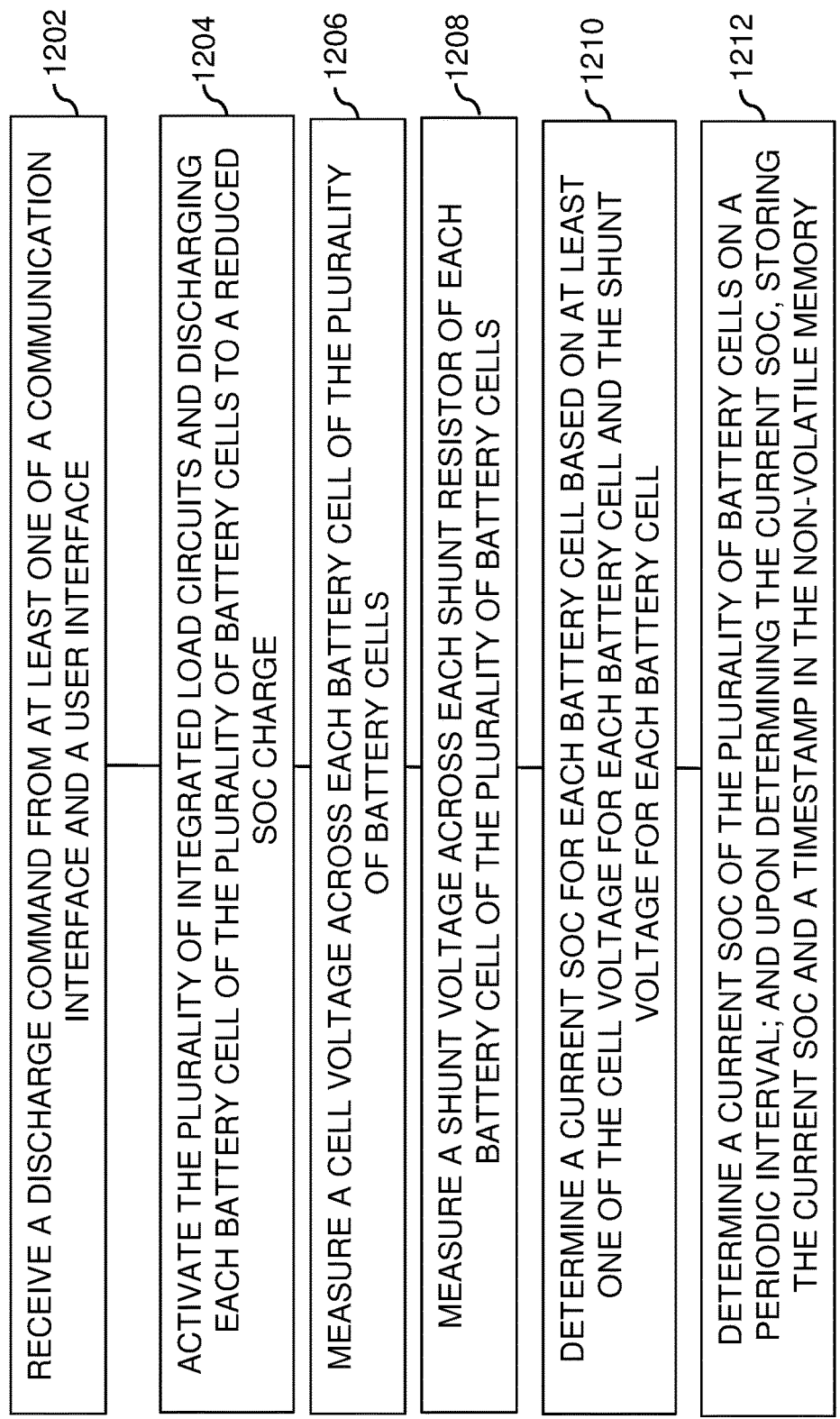

METHODS, SYSTEMS, AND DEVICES FOR MAINTENANCE AND OPTIMIZATION OF BATTERY CABINETS

CROSS REFERENCE TO RELATED APPLICATIONS

This application is related to co-pending U.S. utility patent application Ser. No. 17/547,321 titled "METHODS, SYSTEMS, AND DEVICES FOR MAINTENANCE AND OPTIMIZATION OF BATTERY CABINETS" filed on Dec. 10, 2021, co-pending U.S. utility patent application Ser. No. 17/547,327 titled "METHODS, SYSTEMS, AND DEVICES FOR MAINTENANCE AND OPTIMIZATION OF BATTERY CABINETS" filed on Dec. 10, 2021, and co-pending U.S. utility patent application Ser. No. 17/547,335 titled "METHODS, SYSTEMS, AND DEVICES FOR MAINTENANCE AND OPTIMIZATION OF BATTERY CABINETS" filed on Dec. 10, 2021, all of which are herein incorporated by reference.

TECHNICAL FIELD

The present invention relates generally to battery cabinets for uninterruptible power supply (UPS) systems. More specifically; methods, systems, and devices for maintenance and optimization of lithium-ion battery cabinets and lithium-ion battery packs are disclosed.

BACKGROUND

A battery cabinet provides an apparatus for storing batteries for applications such as an uninterruptible power supply (UPS) system. Such a UPS system may be used in telecom, data center, hospital, and/or industrial applications. Because batteries have a finite lifespan, battery cabinets provide a mechanism for servicing and replacing batteries when needed. Historically, valve regulated lead acid (VRLA) battery cells have been the preferred choice of battery cabinets. However, lithium-ion battery cells are becoming a preferred alternative. Lithium-ion battery cells typically have a longer service life with a much greater cycle life. For example, a lithium-ion battery cells may have discharge/charge cycles exceeding 5000 cycles. A VRLA battery cell may be limited to 500 cycles. Additionally lithium-ion battery cells are lighter in weight.

As such, new methods, systems, and devices are needed to better support the transition to lithium-ion batteries and leveraging the value that lithium-ion batteries bring to the aforementioned applications.

SUMMARY

Disclosed herein are methods, systems, and devices for supporting the transition to lithium-ion batteries and leveraging the value that lithium-ion batteries offer in double conversion uninterruptible power supply (UPS) applications.

According to one embodiment, a UPS system includes an alternating current (AC) to direct current (DC) rectifier configured to be electrically coupled with an AC source, a DC to AC inverter configured to be electrically coupled with an AC load, a DC bus electrically coupled between the AC to DC rectifier and the DC to AC inverter. The UPS system also includes a diode electrically coupled between the DC bus and a first battery cell of a plurality of battery cells, and a by-pass relay having a first terminal electrically coupled with an anode of the diode and a second terminal electrically coupled with a cathode of the diode.

In some embodiments, the UPS system may further include a controller configured for determining a forward bias condition of the diode and transitioning the by-pass relay from an open position to a closed position upon determining the forward bias condition. In certain embodiments, the by-pass relay may be an electromechanical relay.

In some embodiments, determining a forward bias condition of the diode may be based on determining a current flow between the plurality of battery cells and the DC bus that indicates charge is being drained from the plurality of battery cells.

In some embodiments, the controller may be further configured for determining the current flow from the plurality of battery cells to the DC bus indicates negligible charge is being drained from the plurality of battery cells and transitioning the relay from the closed position to the open position.

In some embodiments, the UPS system may further include a resistor electrically coupled between the DC bus and the plurality of battery cells, and determining the current flow may be based on a voltage measured across the resistor.

In some embodiments, the plurality of battery cells may be a plurality of lithium-ion battery cells. In further embodiments, the UPS system may further include a lithium-ion battery charger, a charge current resistor, and a charge enable relay coupled in series across the cathode of the diode and the anode of the diode. The controller may be further configured for activating the charge enable relay based on a state-of-charge (SOC) of the plurality of battery cells and a voltage measured on the DC bus. In other embodiments, the plurality of battery cells may be a plurality of lead acid battery cells.

In some embodiments, the UPS system may further include battery cell test circuitry electrically coupled with the controller. The battery cell test circuitry may be configured for determining the SOC and a state-of-health of the plurality of battery cells.

In some embodiments, the UPS system may further include an indicator electrically coupled with the controller, wherein the indicator indicates at least one of a charging condition and a discharging condition of the plurality of battery cells.

In another embodiment, a method is implemented by a controller within a UPS system. The method includes determining a forward bias condition of a diode and transitioning a by-pass relay from an open position to a closed position. The diode may be coupled between a DC bus and a plurality of battery cells. The by-pass relay may have a first terminal electrically coupled with an anode of the diode and a second terminal electrically coupled with a cathode of the diode.

In some embodiments, determining the forward bias condition of the diode may be based on determining a current flow between the plurality of battery cells and the DC bus indicating charge is being drained from the plurality of battery cells.

In some embodiments, the UPS system may further include a resistor electrically coupled between the DC bus and the plurality of battery cells, and determining the current flow may be based on a voltage measured across the resistor.

In some embodiments, the method may further include determining the current flow from the plurality of battery cells to the DC bus indicating negligible charge is being drained from the plurality of battery cells and transitioning the by-pass relay from the closed position to the open position.

In some embodiments, the by-pass relay may be an electromechanical relay.

In some embodiments, the UPS may further include an AC to DC rectifier configured to be electrically coupled with an AC source and a DC to AC inverter configured to be electrically coupled with an AC load. The DC bus may be electrically coupled between the AC to DC rectifier and the DC to AC inverter.

In some embodiments, the UPS system may further include an indicator electrically coupled with the controller and the method may further include changing a state of the indicator based on the plurality of battery cells changing from a charging condition to a discharging condition.

In some embodiments, the plurality of battery cells may be a plurality of lithium-ion battery cells. In certain embodiments, the UPS system may further include a lithium-ion battery charger, a charge current resistor, and a charge enable relay coupled in series across the cathode of the diode and the anode of the diode, and the method may further include activating the charge enable relay based on a state-of-charge (SOC) of the plurality of battery cells and a voltage measured on the DC bus. In other embodiments, the plurality of battery cells may be a plurality of lead acid battery cells.

In another embodiment, a non-transitory computer-readable storage medium is disclosed. The non-transitory computer-readable storage medium stores instructions to be implemented on a controller within an uninterruptible power supply (UPS) system. The instructions when executed by the controller provide a method for determining a forward bias condition of a diode and transitioning a by-pass relay from an open position to a closed position. The diode is coupled between a DC bus and a plurality of battery cells. The by-pass relay has a first terminal electrically coupled with a anode of the diode and a second terminal electrically coupled with a cathode of the diode.

In another embodiment, a battery pack includes (1) a plurality of battery cells electrically coupled between a positive terminal and a negative terminal; (2) monitoring circuitry electrically coupled with the plurality of battery cells; (3) a non-volatile memory; and (4) a controller electrically coupled with the monitoring circuitry and the non-volatile memory. The controller is configured for (1) receiving first measured data from the monitoring circuitry; (2) determining first time window data associated with the first measured data; and (3) upon determining the first measured data exceeds a first measured data limit and the first time window data exceeds a first time window data limit, storing the first measured data and the first time window data in the non-volatile memory.

In some embodiments, the battery pack may be a field replaceable battery pack for a UPS system.

In some embodiments, the first measured data limit and the first time window data limit may be associated with a warranty violation for the battery pack.

In some embodiments, the first measured data limit and the first time window data limit may be associated with an abnormal state-of-health (SOH) of the battery pack.

In some embodiments, the battery pack may further include a communication interface electrically coupled with the controller and the controller may be further configured for transmitting the first measured data and the first time window data via the communication interface.

In some embodiments, the communication interface may be a personal area network (PAN) communication interface.

In some embodiments, the communication interface may be compliant to at least one version of a Bluetooth® standard, a Universal Serial Bus (USB) standard, or the like.

In some embodiments, the communication interface may be a local area network (LAN) interface, a wide area network (WAN) interface, or the like. In other embodiments, the communication interface may be an external bus interface (EBI), a controller area network (CAN) bus interface, or the like.

In some embodiments, the first measured data may include temperature data and/or vibration data.

In some embodiments, the first measured data may include charge current data and/or discharge current data.

In some embodiments, the first measured data may include float voltage data.

In some embodiments, the first measured data may include ohmic data. In further embodiments, the first measured data may include a first ohmic value measured while inducing a first current at a first frequency to a first battery cell of the plurality of battery cells. In still further embodiments, the first measured data may further include a second ohmic value measured while inducing a second current at a second frequency to the first battery cell of the plurality of battery cells.

In still further embodiments, the first measured data further may include a third ohmic value measured while inducing direct current to the first battery cell of the plurality of battery cells.

In some embodiments, the plurality of battery cells may be a plurality of lithium-ion battery cells. In other embodiments, the plurality of battery cells may be a plurality of lead acid battery cells.

In some embodiments, the controller may include a real-time clock and the controller may be further configured to store a time-stamp associated with the first measured data and the first time window data.

In another embodiment, a method is implemented by a controller within a battery pack. The method includes (1) receiving first measured data from monitoring circuitry electrically coupled with a plurality of battery cells within the battery pack; (2) determining first time window data associated with the first measured data; and (3) upon determining the first measured data exceeds a first measured data limit and the first time window data exceeds a first time window data limit, storing the first measured data and the first time window data in non-volatile memory within the battery pack.

In another embodiment, a non-transitory computer-readable storage medium is disclosed. The non-transitory computer-readable storage medium stores instructions to be implemented on a controller within a battery pack. The instructions when executed by the controller provide a method. The method includes (1) receiving first measured data from monitoring circuitry electrically coupled with a plurality of battery cells within the battery pack; (2) determining first time window data associated with the first measured data; and (3) upon determining the first measured data exceeds a first measured data limit and the first time window data exceeds a first time window data limit, storing the first measured data and the first time window data in non-volatile memory within the battery pack.

In another embodiment, a battery pack includes (1) a plurality of battery cells electrically coupled between a positive terminal and a negative terminal; (2) a controller; (3) battery monitoring and control circuitry electrically coupled with the plurality of battery cells and electrically coupled with the controller; (4) a primary communication interface electrically coupled with the controller; and a secondary communication interface electrically coupled with the controller. The controller is configured for (1)

determining primary communication status data via the primary communication interface; (2) determining secondary communication status data via the secondary communication interface; (3) receiving from the battery monitoring and control circuitry, battery status data associated with the plurality of battery cells; and (4) transmitting the battery status data via at least one of the primary communication interface and the secondary communication interface based on the primary communication status data and the secondary communication status data.

In some embodiments, the battery status data may include state SOC data. In further embodiments, the battery status data may include SOH data.

In some embodiments, the controller may be further configured for detecting an over current charge condition; and upon detecting the over current charge condition, electrically disconnecting the plurality of battery cells from at least one of the positive terminal and the negative terminal.

In some embodiments, the controller may be further configured for detecting an over current discharge condition; and upon detecting the over current discharge charge condition, electrically disconnecting the plurality of battery cells from at least one of the positive terminal and the negative terminal.

In some embodiments, the controller may be further configured for detecting an over voltage condition; and upon detecting the over voltage condition, electrically disconnecting the plurality of battery cells from at least one of the positive terminal and the negative terminal.

In some embodiments, the first communication interface may be an EBI, a PAN communication interface, a LAN interface; a WAN interface, or the like.

In some embodiments, the first communication interface may be compliant to at least one version of a Bluetooth® standard, a USB standard, and or the like. In other embodiments, the first communication interface may be a CAN bus interface.

In some embodiments, second communication interface may be an EBI, a PAN communication interface, a LAN interface; a WAN interface, or the like.

In some embodiments, the second communication interface may be compliant to at least one version of a Bluetooth® standard, a USB standard, and or the like. In other embodiments, the second communication interface may be a CAN bus interface.

In some embodiments, the primary communication status data may be determined via primary keep-alive communication with a first external computing device.

In some embodiments, the battery pack may be configured to be installed in a battery cabinet associated with an uninterruptible power supply (UPS) system; and the first external computing device is a battery monitoring system configured for monitoring the battery cabinet.

In some embodiments, the secondary communication status data may be determined via secondary keep-alive communication with a second external computing device.

In some embodiments, the plurality of battery cells may be a plurality of lithium-ion battery cells.

In some embodiments, the battery pack may be a field replaceable battery pack for an uninterruptible power supply (UPS) system.

In another embodiment, a method implemented by a controller within a battery pack is disclosed. The method includes (1) determining primary communication status data of a primary communication interface electrically coupled with the controller; (2) determining secondary communication status data of a secondary communication interface electrically coupled with the controller; (3) receiving from battery monitoring and control circuitry, battery status data associated with a plurality of battery cells; and (4) transmitting the battery status data via at least one of the primary communication interface and the secondary communication interface based on the primary communication status data and the secondary communication status data: The plurality of battery cells is electrically coupled between a positive terminal and a negative terminal of the battery pack. The battery monitoring and control circuitry is electrically coupled with the controller and electrically coupled with the plurality of battery cells.

In another embodiment, a non-transitory computer-readable storage medium is disclosed. The non-transitory computer-readable storage medium storing instructions to be implemented on a controller within a battery pack. The instructions when executed by the controller provide a method. The method includes (1) determining primary communication status data of a primary communication interface electrically coupled with the controller; (2) determining secondary communication status data of a secondary communication interface electrically coupled with the controller; (3) receiving from battery monitoring and control circuitry, battery status data associated with a plurality of battery cells; and (4) transmitting the battery status data via at least one of the primary communication interface and the secondary communication interface based on the primary communication status data and the secondary communication status data: The plurality of battery cells is electrically coupled between a positive terminal and a negative terminal of the battery pack. The battery monitoring and control circuitry is electrically coupled with the controller and electrically coupled with the plurality of battery cells.

In another embodiment, a battery pack includes (1) a plurality of battery cells electrically coupled between a positive terminal and a negative terminal; (2) monitoring and control circuitry electrically coupled with the plurality of battery cells; (3) a controller electrically coupled with the monitoring and control circuitry; (4) a communication interface electrically coupled with the controller; and (5) a user interface electrically coupled with the controller. The monitoring and control circuitry includes a plurality of integrated shunt resistors and a plurality of integrated load circuits electrically coupled with the plurality of battery cells. The monitoring and control circuitry is configured for determining an SOC for each battery cell of the plurality of battery cells and for discharging each battery cell to a predetermined SOC.

In some embodiments, the controller may be configured for (1) receiving a discharge command from at least one of the communication interface and the user interface; (2) activating the plurality of integrated load circuits; and (3) discharging each battery cell of the plurality of battery cells to a reduced SOC.

In some embodiments, the reduced SOC may be less than 50 percent. In certain embodiments, the reduced SOC may be between 40 percent and 50 percent. In other embodiments, the reduced SOC may be between 30 percent and 40 percent. In still other embodiments, the reduced SOC may be between 20 percent and 30 percent. In still other embodiments, the reduced SOC may be between 10 percent and 20 percent.

In some embodiments, the plurality of integrated load circuits may include a plurality of load resistors.

In some embodiments, the controller may be configured for (1) measuring a cell voltage across each battery cell of the plurality of battery cells; and (2) determining a current SOC for each battery cell based on the cell voltage.

In some embodiments, the controller may be further configured for (1) measuring a shunt voltage across each shunt resistor of each battery cell of the plurality of battery cells; and (2) determining the current SOC for each battery cell is further based on the shunt voltage.

In some embodiments, the battery pack may further include a non-volatile memory electrically coupled with the controller; and the controller may be configured for determining a current SOC of the plurality of battery cells on a periodic interval; and upon determining the current SOC, storing the current SOC and a timestamp in the non-volatile memory. In certain embodiments, the period interval is a least one of an hourly interval, a daily interval, a weekly interval, a monthly interval, and/or the like.

In some embodiments, the communication interface may be an EBI, a PAN communication interface, a LAN interface; a WAN interface, or the like.

In some embodiments, the communication interface may be compliant to at least one version of a Bluetooth® standard, a USB standard, and or the like. In other embodiments, the first communication interface may be a CAN bus interface.

In some embodiments, at least a portion of the plurality of battery cells may be coupled in parallel between the positive terminal and the negative terminal.

In some embodiments, at least of portion of the plurality of battery cells may be coupled in series between the positive terminal and the negative terminal.

In some embodiments, the user interface may include a touchpad display. In other embodiments, the user interface may include a liquid crystal display and at least one switch.

In some embodiments, the battery pack may be a field replaceable battery pack for a UPS system.

In some embodiments, the plurality of battery cells may be a plurality of lithium-ion battery cells.

In another embodiment, a method implemented by a controller within a battery pack is disclosed. The method includes receiving a discharge command from at least one of a communication interface and a user interface. The communication interface is electrically coupled with the controller and the user interface is electrically coupled with the controller. The battery pack also includes a plurality of battery cells electrically coupled between a positive terminal and a negative terminal; and monitoring and control circuitry electrically coupled with the plurality of battery cells. The monitoring and control circuitry comprises a plurality of integrated shunt resistors and a plurality of integrated load circuits electrically coupled with the plurality of battery cells. The monitoring and control circuitry is configured for determining an SOC for each battery cell of the plurality of battery cells and for discharging each battery cell to a predetermined SOC. The method further includes activating the plurality of integrated load circuits and discharging each battery cell of the plurality of battery cells to a reduced SOC charge.

In another embodiment, a non-transitory computer-readable storage medium is disclosed. The non-transitory computer-readable storage medium stores instructions to be implemented on a controller within a battery pack. The instructions when executed by the controller provide a method. The method includes receiving a discharge command from at least one of a communication interface and a user interface. The communication interface is electrically coupled with the controller and the user interface is electrically coupled with the controller. The battery pack also includes a plurality of battery cells electrically coupled between a positive terminal and a negative terminal; and monitoring and control circuitry electrically coupled with the plurality of battery cells. The monitoring and control circuitry comprises a plurality of integrated shunt resistors and a plurality of integrated load circuits electrically coupled with the plurality of battery cells. The monitoring and control circuitry is configured for determining an SOC for each battery cell of the plurality of battery cells and for discharging each battery cell to a predetermined SOC. The method further includes activating the plurality of integrated load circuits and discharging each battery cell of the plurality of battery cells to a reduced SOC charge.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The present embodiments are illustrated by way of example and are not intended to be limited by the figures of the accompanying drawings. In the drawings:

FIG. 12 depicts a flowchart illustrating a method implemented by a controller within a battery pack in accordance with embodiments of the present disclosure.

DETAILED DESCRIPTION

Figure 1:
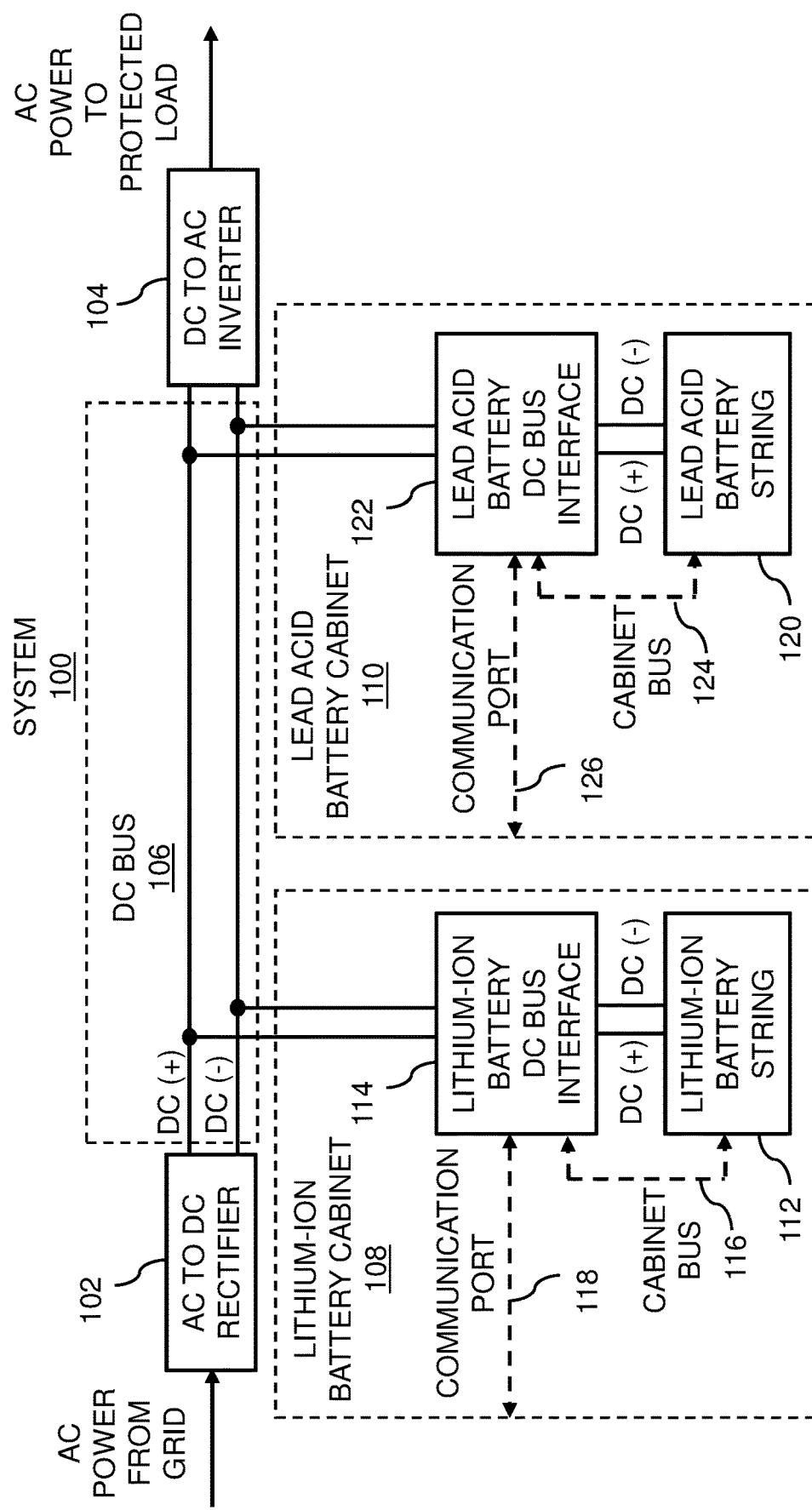
FIG. 1 depicts a block diagram illustrating a system for providing an uninterruptible power supply (UPS) in accordance with embodiments of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Methods, systems, and devices are disclosed herein better supporting the transition to lithium-ion batteries and leveraging the value that lithium-ion batteries bring to uninterruptible power supply (UPS) applications.

FIG. 1 depicts a block diagram illustrating a system 100 for providing a UPS using double power conversion in accordance with embodiments of the present disclosure. The system 100 includes an alternating current (AC) to direct current (DC) rectifier 102 electrically coupled with a DC to AC inverter 104 via a DC bus 106. The AC to DC rectifier 102 is configured to receive AC power from an electrical grid. The electrical grid may provide three phase AC power, split-phase AC power, single phase AC power, or the like to an input of the AC to DC rectifier 102. The DC to AC inverter 104 is configured to provide AC power to a protected load. The protected load may be telecom equipment, a datacenter, a hospital or other medical facility, an industrial facility, a home residence, and/or the like. The AC power supplied to the protected load may be three phase AC power, split-phase AC power, single phase AC power, or the like.

A lithium-ion battery cabinet 108 and a lead acid battery cabinet 110 are electrically coupled with the DC bus 106 to provide power to the DC to AC inverter upon a failure of the electrical grid. The lithium-ion battery cabinet 108 includes a lithium-ion battery string 112 electrically coupled with a lithium-ion battery bus interface 114. The lithium-ion battery cabinet 108 also includes a cabinet bus 116 for communication (including monitoring and control) between the lithium-ion battery bus interface 114 and the lithium-ion battery string 112. In certain embodiments, the cabinet bus 116 may be at least partially compliant to a controller area network (CAN) bus, Ethernet bus, an Inter Equipment Bus (IEBus), General Purpose Interface Bus (GPIB), or the like. The lithium-ion battery bus interface 114 also includes a communication port 118 for external monitoring and control of the lithium-ion battery cabinet 108. The communication port 118 may be a wired communication port such as an Ethernet interface, an RS-232 interface, an RS-422 interface, or the like. The communication port may also be a wireless communication port such as a WiFi interface, a Bluetooth® interface, or the like. The communication port may also be an optical communication port such as an optical Ethernet interface. In some embodiments, the communication port 118 may include a plurality of the aforementioned communication ports.

The lead acid battery cabinet 110 includes a lead acid battery string 120 electrically coupled with a lead acid battery bus interface 122. The lead acid battery cabinet 110 also includes a cabinet bus 124 for communication (including monitoring and control) between the lead acid battery bus interface 122 and the lead acid battery string 120. The lead acid battery bus interface 120 also includes a communication port 126 for external monitoring and control of the lead acid battery cabinet 110. In some embodiments, the system 100 may exclude the lead acid battery cabinet 110. In other embodiments, the system may exclude the lithium-ion battery cabinet 108.

Figure 2:
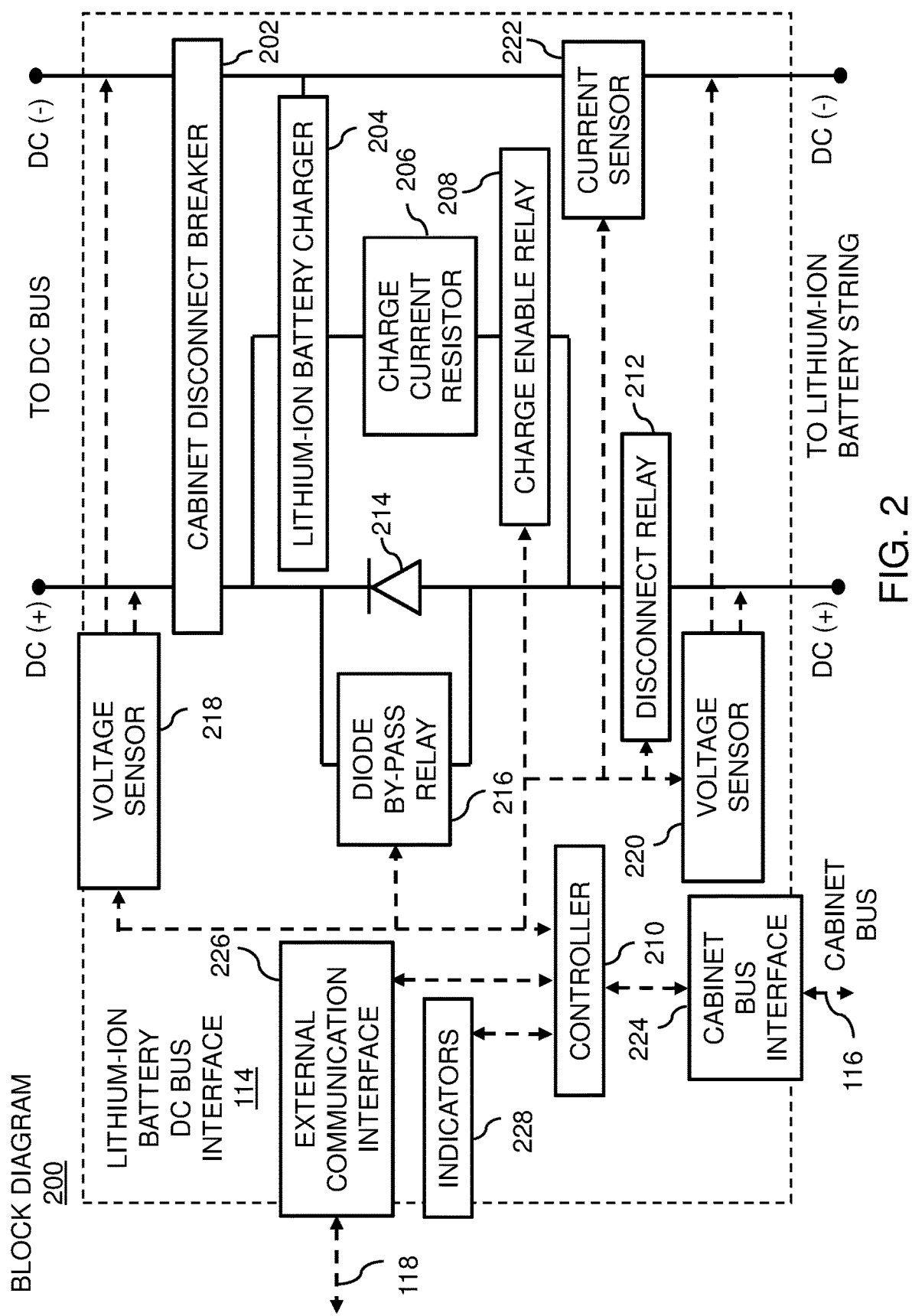
FIG. 2 depicts a block diagram illustrating a lithium-ion battery direct current (DC) bus interface of the system of FIG. 1 in accordance with embodiments of the present disclosure.

FIG. 2 depicts a block diagram 200 illustrating the lithium-ion battery DC bus interface 114 of the system 100 of FIG. 1 in accordance with embodiments of the present disclosure. The lithium-ion battery DC bus interface 114 includes a cabinet disconnect breaker 202 configured to disconnect both a positive DC (+) terminal and a negative DC (−) terminal from the DC bus 106 of the system 100 of FIG. 1 when an over current condition is detected. The lithium-ion battery DC bus interface 114 also includes a lithium-ion battery charger 204, a charge current resistor 206, and a charge enable relay 208 configured for charging the lithium-ion battery string 112 when the AC power from the electrical grid is stable. A controller 210 is configured to control the charge enable relay 208. The charge enable relay 208 may be an electromechanical relay. A disconnect relay 212 is configured to disconnect the lithium-ion battery DC bus interface 114 from a positive terminal of the lithium-ion battery string 112. The controller 210 is also configured to control the disconnect relay 212. For example, the controller 202 may activate the disconnect relay 212 when a voltage across the lithium-ion battery string 112 approaches a DC under voltage trip point rating for the lithium-ion battery string 112. In certain embodiments, the disconnect relay 212 may be an electromechanical relay. The controller 210 may include an ARM processor with flash memory, static random access memory (SRAM) memory, multiple analog-to-digital converters (ADCs), and multiple digital-to-analog converters (DACs).

The lithium-ion battery DC bus interface 114 also includes a diode 214 and diode by-pass relay 216. The diode 214 provides a blocking (i.e. isolation) of the lithium ion battery string 112 from the DC bus 106 when AC power from the grid is stable and the AC to DC rectifier 102 is functioning correctly. Specifically, the diode 214 prevents discharge of the lithium ion battery string 112 to the DC bus 106 when a bus voltage is greater than a battery string voltage. When the bus voltage drops (due to an AC grid failure and/or AC to DC rectifier 102 failure) below the battery string voltage, the diode 214 becomes forward biased and begins discharging the lithium ion battery string 112 on to the DC bus 106. As such, the DC to AC inverter 104 never loses power during a transition to the lithium ion battery string 112 and is able to provide interrupted service to the protected load.

The diode 214 may be a Schottky diode. In some embodiments, the diode 214 may be replaced with a plurality of Schottky diodes is a parallel configuration for current sharing purposes. In other embodiments, the diode 214 may be replaced by a thyristor, a metal-oxide-semiconductor field-effect transistor (MOSFET), and/or the like.

The diode by-pass relay 216 is configured to short circuit the diode 214 when the controller 210 has determined the diode 214 has become forward biased and/or the lithium-ion battery string is being discharged 112. Without use of the diode by-pass relay 216, the diode 214 will dissipate heat due to its forward voltage drop affecting the efficiency of the system 100 during a grid failure. Additionally by using the diode by-pass relay 216, the current rating and voltage rating of the diode 214 may be reduced.

The controller 210 is also configured to control the diode by-pass relay 216. The lithium-ion battery DC bus interface 114 also includes a voltage sensor 218 electrically coupled with an ADC port of the controller 210 and configured to monitor a voltage of the DC bus 106. A voltage sensor 220 is electrically coupled with an ADC port of the controller 210 and configured to monitor a voltage of the lithium-ion battery string 112. A current sensor 222 is electrically coupled with the controller 210 and configured to monitor a current flowing either in or out of the lithium-ion battery string 112. The current sensor 222 may comprise a series resistor and the controller 210 may be configured to monitor a voltage across the series resistor using an ADC port. The controller 210 may then calculate the current (and/or a current flow direction) based on a known value of the series resistor and the measured voltage. The controller 210 may also activate and deactivate the by-pass relay 216 based on a current flow direction.

The lithium-ion battery DC bus interface 114 also includes a cabinet bus interface 224, an external communication interface 226, and indicators 228. The cabinet bus interface 224 is compliant with the cabinet bus 116 of the lithium-ion battery cabinet 108 described in FIG. 1. The external communication interface 226 is compliant with the communication port 118 of the lithium-ion battery cabinet 108 described in FIG. 1. The indicators 228 provide status of the lithium-ion battery cabinet 108. For example the indicators 228 may provide a charge level of the lithium-ion battery string 112, an indication whether the lithium-ion battery cabinet 108 is providing DC power for the DC to AC inverter 104, an indication whether the lithium-ion battery cabinet 108 is in a connect state or a disconnect state from the DC bus 106, an indication whether the lithium-ion battery DC bus interface 114 is in a connect state or a disconnect state from the lithium-ion battery string 112. In some embodiments (not shown in FIG. 2), the indicators 228 may be provided by a graphical user interface (GUI) electrically coupled with the controller 210. In certain embodiments, the GUI may be a touch pad display.

In some embodiments, the lead acid battery DC bus interface 124 may be configured to operate in a similar manner as the lithium-ion battery DC bus interface. However, the lithium-ion battery charger 204 would not be used.

Figure 3:
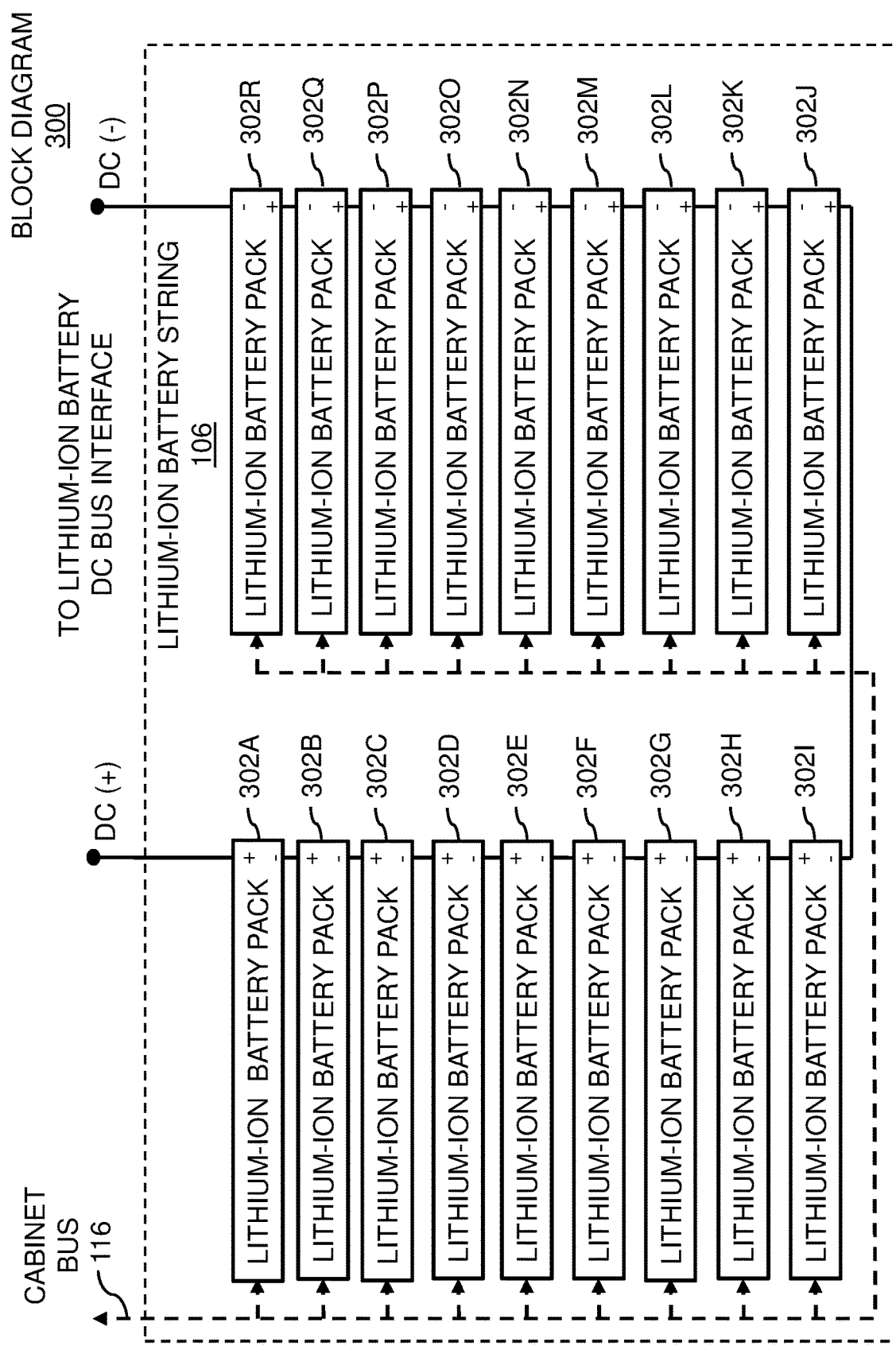
FIG. 3 depicts a block diagram illustrating a lithium-ion battery string of the system of FIG. 1 in accordance with embodiments of the present disclosure.

FIG. 3 depicts a block diagram 300 illustrating the lithium-ion battery string 112 of the system 100 of FIG. 1 in accordance with embodiments of the present disclosure. The lithium-ion battery string 106 includes eighteen lithium-ion battery packs 302A-302R configured in a series arrangement between a positive DC (+) terminal and a negative DC (−) terminal.

In some embodiments the lithium-ion battery string 112 may include more or less lithium-ion battery packs. The cabinet bus 116 of the system 100 of FIG. 1 is electrically coupled with the eighteen lithium-ion battery packs 302A-302R to provide monitoring and per pack test capability.

Figure 4:
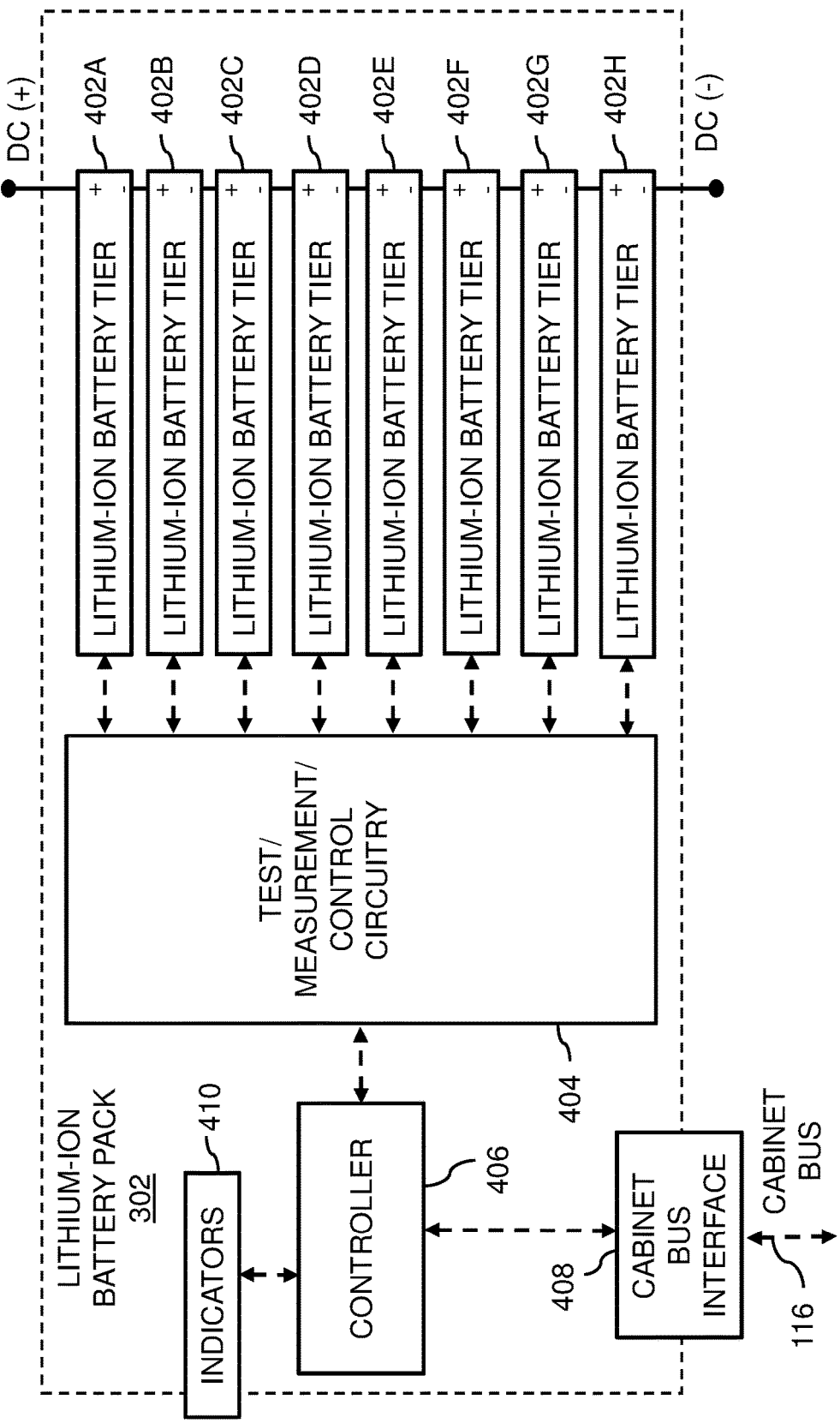
FIG. 4 depicts a block diagram illustrating a lithium-ion battery pack of the block diagram of FIG. 3 in accordance with embodiments of the present disclosure.

FIG. 4 depicts a block diagram 400 illustrating the lithium-ion battery pack 302 of the lithium-ion battery pack string 106 of the block diagram 300 described in FIG. 3 in accordance with embodiments of the present disclosure. The lithium-ion battery pack 302 includes eight lithium-ion battery tiers 402A-402H configured in a series arrangement between a positive DC (+) terminal and a negative DC (−) terminal. In some embodiments the lithium-ion battery pack 302 may include more or less lithium-ion battery tiers.

The lithium-ion battery pack 302 also includes test/measurement/control circuitry 404 electrically coupled with a controller 406. The test/measurement/control circuitry 404 may be configured to measure temperature within the lithium-ion battery pack 302 and/or measure temperature within each lithium-ion battery tier (i.e. 402A-402H). The test/measurement/control circuitry 404 may also be configured to measure state of charge (SOC) and state of health (SOH) of the lithium-ion battery pack 302. In one embodiment, the test/measurement/control circuitry 404 may be configured to measure ohmic values at different frequencies to determine the SOH. For example the test and measurement circuitry 404 may induce a current at DC and/or other predetermined frequencies for predetermined period time periods while measuring a voltage across a lithium-ion cell of interest filtered to the predetermined frequency. In some embodiments, the test/measurement/control circuitry 404 may utilize separate current and voltage leads to increase the accuracy of the ohmic value measurement. The test/measurement/control circuitry 404 may also include an accelerometer for measuring vibration data. In certain embodiments, the accelerometer may be a three-axis accelerometer. The test/measurement/control circuitry 404 may also include a plurality of integrated shunt resistors and a plurality of integrated load circuits electrically coupled with the plurality of battery cells. The controller 406 may include non-volatile memory and a real-time clock embedded within or externally coupled.

Additionally, the test and measurement circuitry 404 may also be configured to measure and store data (including timestamps) within the lithium-ion battery pack 302 from time of manufacture (i.e. before installation within the lithium-ion battery string 106). Once the lithium-ion battery pack 302 is installed in the lithium-ion battery string 106 and the lithium-ion battery string 106 is connected with the lithium-ion battery DC bus interface 104, the controller 406 may report the stored data to the controller 210.

A cabinet bus interface 408 is electrically coupled with the controller 406 and is compliant with the cabinet bus 116 of FIG. 1. Indicators 410 are electrically coupled with the controller 406 and configured to provide a status of the lithium-ion battery pack 302.

Figure 5:
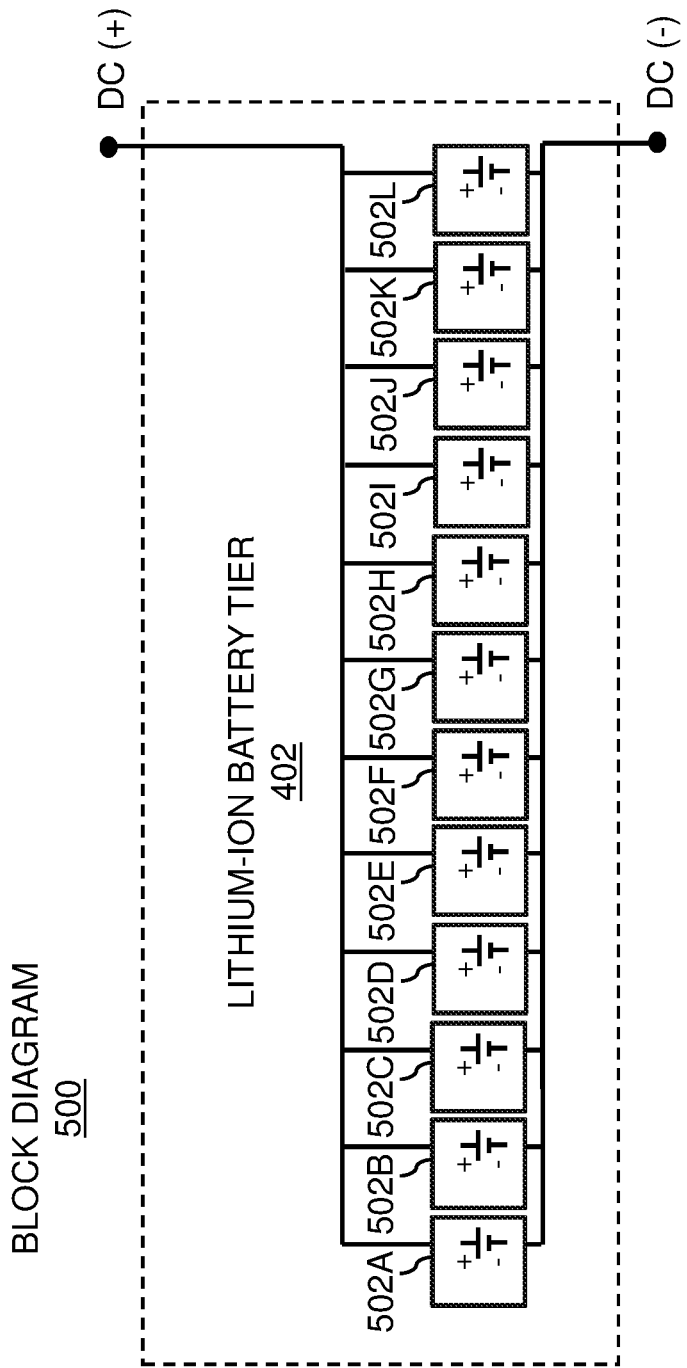
FIG. 5 depicts a block diagram of a lithium-ion battery tier of the block diagram of FIG. 4 in accordance with embodiments of the present disclosure.

FIG. 5 depicts a block diagram 500 depicts the lithium-ion battery tier 402 of the lithium-ion battery pack 302 of the block diagram 400 of FIG. 4 in accordance with embodiments of the present disclosure. The lithium-ion battery tier 402 includes twelve lithium-ion battery cells 502A-502L configured in a parallel arrangement between a positive DC (+) terminal and a negative DC (−) terminal. Each lithium-ion battery cell may be configured to provide a minimum of 4 amp-hours (14.7 watt-hours) and nominally provide 4.2 amp-hours (15.5 watt-hours). In some embodiments the lithium-ion battery tier 402 may include more or less lithium-ion battery cells having higher or lower minimum amp-hour ratings and watt-hour ratings.

Overall the lithium-ion battery cabinet 108 (as described) includes 1728 lithium-ion cells in a configuration of 144 lithium-ion battery tiers in series with 12 lithium-ion cells/tier in parallel (i.e. a 144S12P configuration). Without derating, the lithium-ion battery cabinet 108 may have a minimum capacity rating of 25,400 watt-hours (48 amp-hours at 533 volts DC) and a minimum capacity rating of 26,476 watt-hours (50 amp-hours at 533 volts DC).

Figure 6:
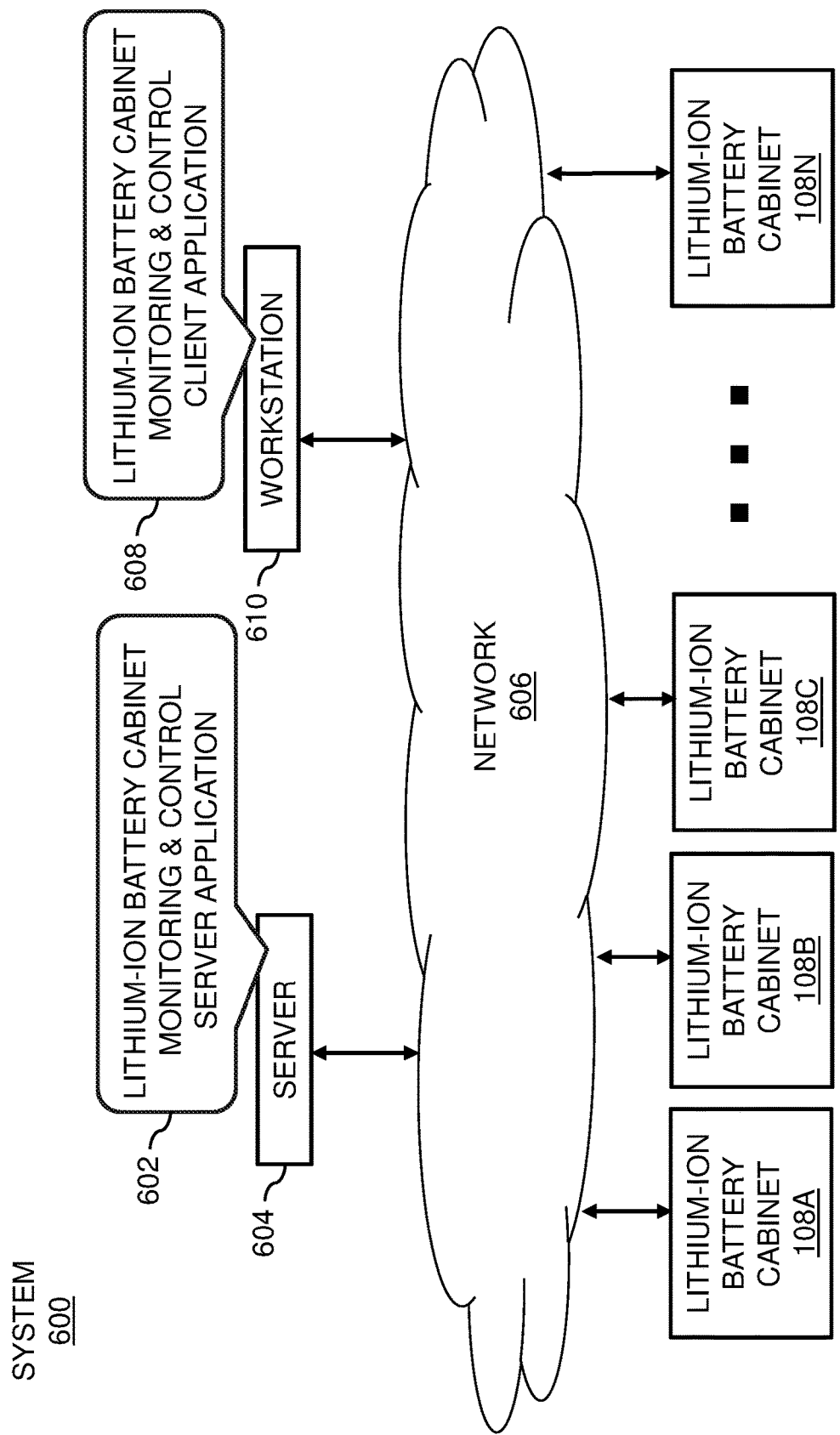
FIG. 6 depicts a block diagram illustrating a system for monitoring a plurality of lithium-ion battery cabinets in accordance with embodiments of the present disclosure

FIG. 6 depicts a block diagram illustrating a system 600 for monitoring a plurality of lithium-ion battery cabinets 108A-108N in accordance with embodiments of the present disclosure. In some embodiments the system may include more or less lithium-ion battery cabinets. The system 600 also includes a lithium-ion cabinet monitoring and control server application 602 executing on a server 604. The server 604 is communicatively coupled with the lithium-ion battery cabinets 108A-108N over a network 606. The network 606 may be any type or combination of wired, wireless, and/or optical networks. The network 606 may include one or more WANs, LANs, and PANs. The network 606 may also include the Internet. The system 600 also includes a lithium-ion cabinet monitoring and control client application 608 executing on a workstation 610. The workstation 610 is communicatively coupled with server 604 over the network 606. In some embodiments, the lithium-ion cabinet monitoring and control client application 608 may be executed on a web browser. In other embodiments, the lithium-ion cabinet monitoring and control client application 608 may communicate directly with the lithium-ion battery cabinets 108A-108N.

Figure 7:
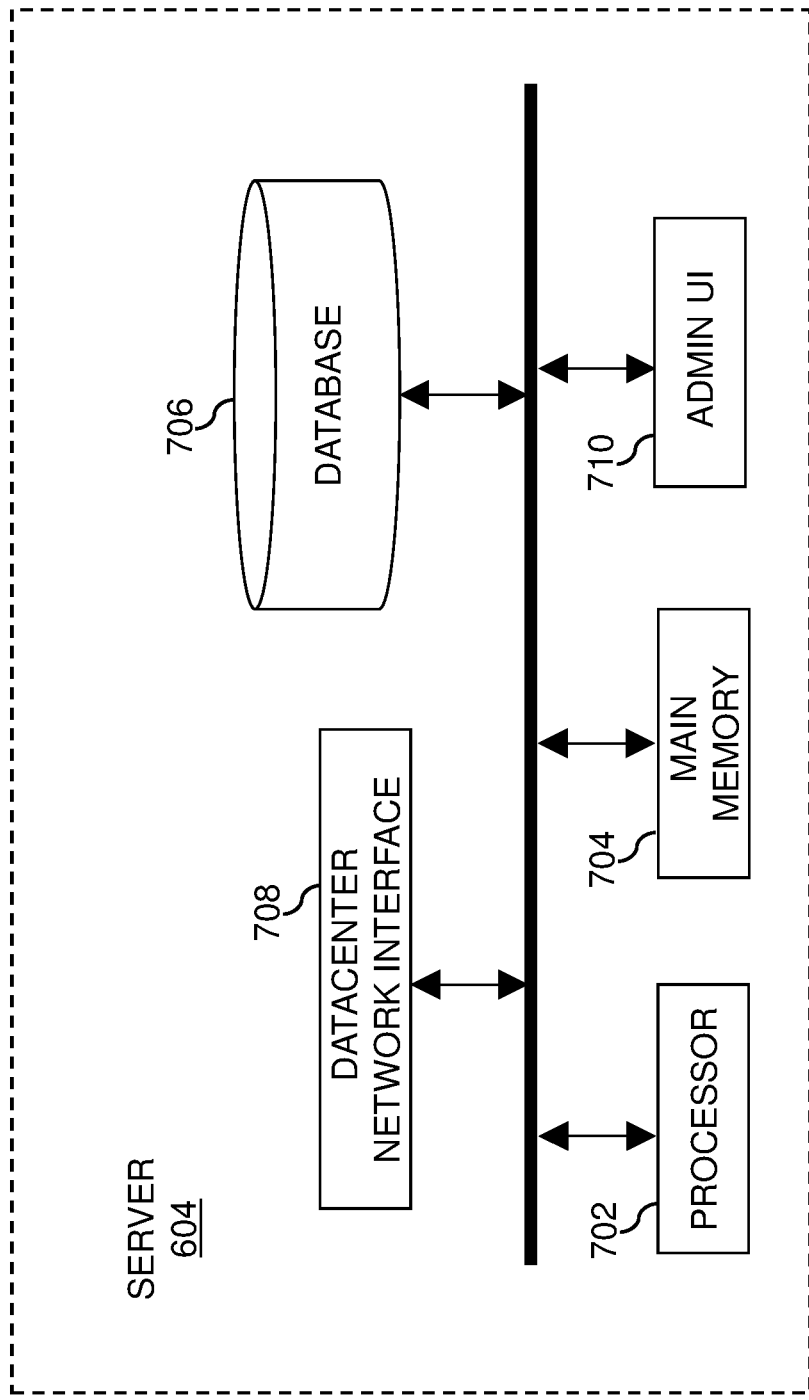
FIG. 7 depicts a block diagram illustrating a server of the system of FIG. 6 in accordance with embodiments of the present disclosure.

FIG. 7 depicts a block diagram 700 illustrating the server 604 of the system 600 described in FIG. 6 in accordance with embodiments of the present disclosure. The server 604 may include at least one of processor 702, a main memory 704, a storage memory (e.g. database) 706, a datacenter network interface 708, and an administration user interface (UI) 710. The server 604 may be configured to host an Ubuntu® server. In some embodiments Ubuntu® server (or other virtual server) may be distributed over a plurality of hardware servers using hypervisor technology. The processor 702 may be a multi-core server class processor suitable for hardware virtualization. The processor may support at least a 64-bit architecture and a single instruction multiple data (SIMD) instruction set. The main memory 704 may include a combination of volatile memory (e.g. random access memory) and non-volatile memory (e.g. flash memory). The database 706 may include one or more hard drives. The datacenter network interface 708 may provide one or more high-speed communication ports to the data center switches, routers, and/or network storage appliances. The datacenter network interface 708 may include high-speed optical Ethernet, InfiniBand (IB), Internet Small Computer System Interface (iSCSI), and/or Fibre Channel interfaces. The administration UI 710 may support local and/or remote configuration of the server 604 by a datacenter administrator.

Figure 8:
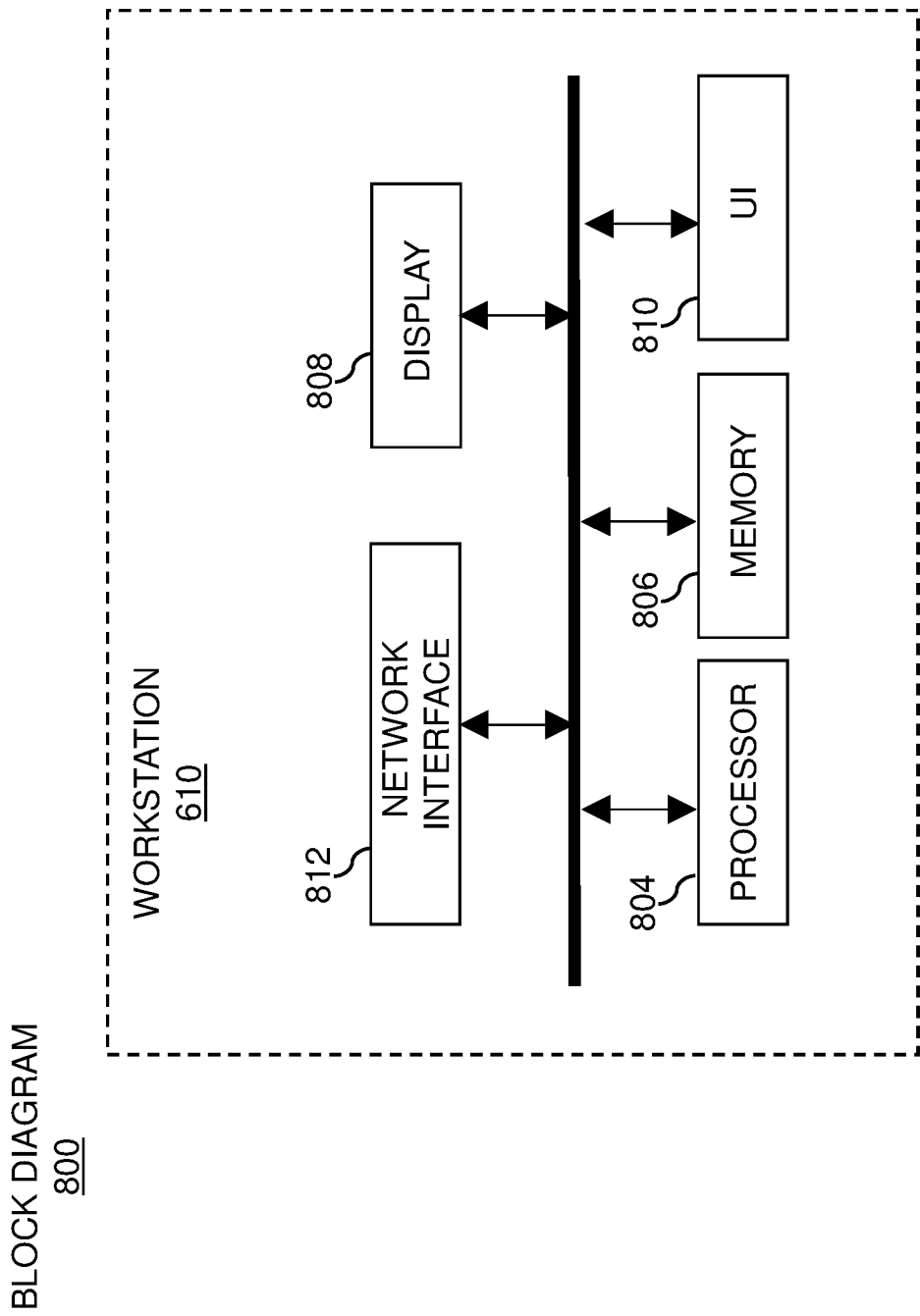
FIG. 8 depicts a block diagram illustrating a workstation of the system of FIG. 6 in accordance with embodiments of the present disclosure.

FIG. 8 depicts a block diagram 800 illustrating the workstation 610 of the system 600 described in FIG. 6 in accordance with embodiments of the present disclosure. The workstation 610 may be configured to communicate with the server 604 over the network 606 in a similar manner as any of the lithium-ion battery cabinets 108A-108N in the system 600 of FIG. 6. The workstation 610 may be configured to host a specific application (as discussed earlier), a browser application, a third party application, or the like. The workstation 610 may include at least one processor 804, a memory 806, a network interface 812, a display 808, and a UI 810, and a network interface 812. The workstation 610 may include an operating system (OS) such as a Windows® OS, a Macintosh® OS, a Linux® OS, or the like. The memory 806 may include a combination of volatile memory (e.g. random access memory) and non-volatile memory (e.g. solid state drive and/or hard drives). The display 808 may be an external display (e.g. computer monitor) or internal display (e.g. laptop). The UI 810 may include a keyboard, and a pointing device (e.g. mouse). The network interface 812 may be a wired Ethernet interface or a Wi-Fi interface.

Figure 9:
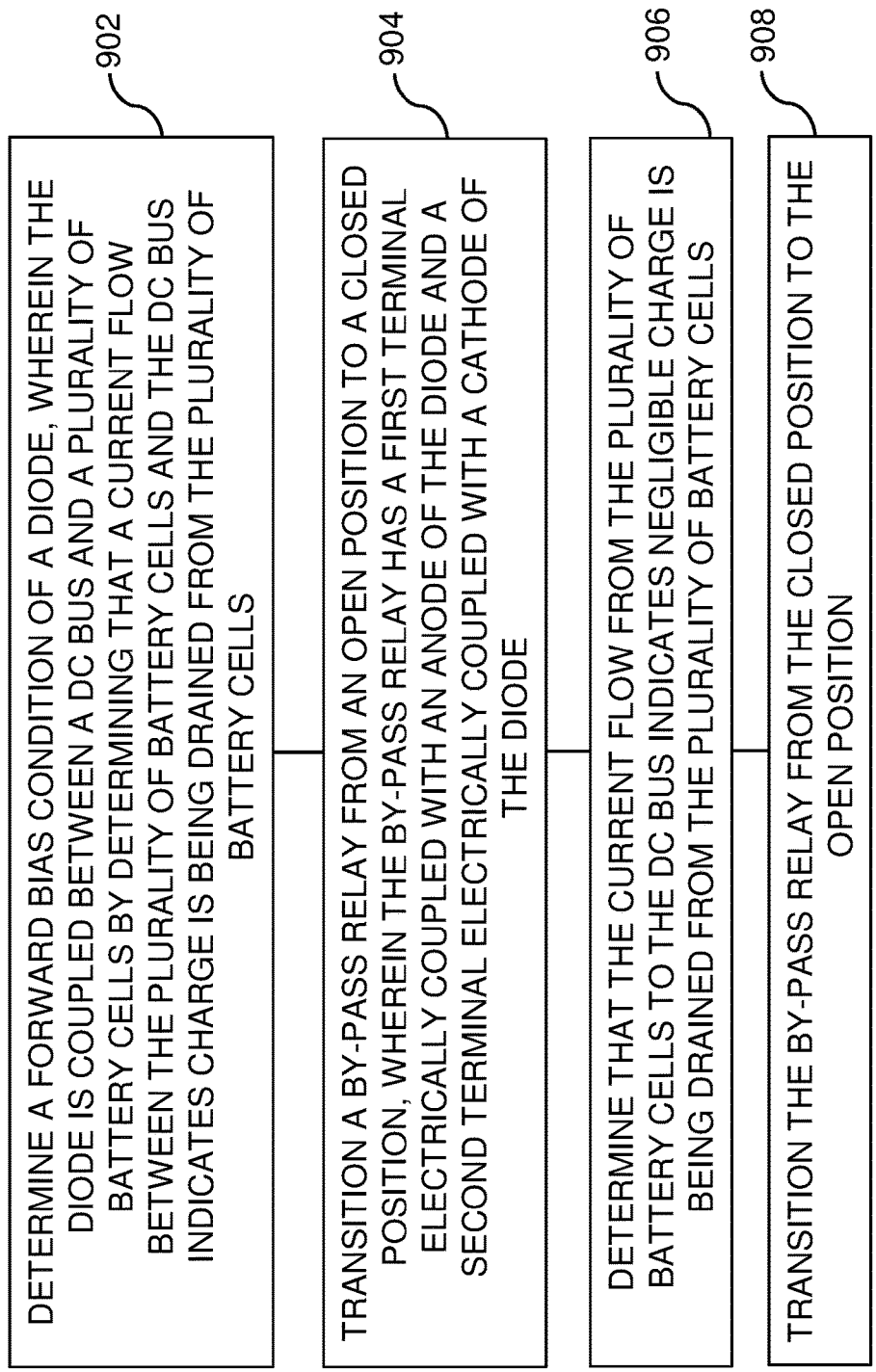
FIG. 9 depicts a flowchart illustrating a method implemented by a controller within a UPS system in accordance with embodiments of the present disclosure.

FIG. 9 depicts a flowchart 900 illustrating a method implemented by a controller within a UPS system in accordance with embodiments of the present disclosure. The UPS system may be similar to the system 100 of FIG. 1.

In step 902 the method includes determining a forward bias condition of a diode, wherein the diode is coupled between a DC bus and a plurality of battery cells by determining that a current flow between the plurality of battery cells and the DC bus indicates charge is being drained from the plurality of battery cells.

In step 904, the method further includes transitioning a by-pass relay from an open position to a closed position, wherein the by-pass relay has a first terminal electrically coupled with an anode of the diode and a second terminal electrically coupled with a cathode of the diode.

In step 906, the method further includes determining the current flow from the plurality of battery cells to the DC bus indicating negligible charge is being drained from the plurality of battery cells.

In step 908, the method further includes transitioning the by-pass relay from the closed position to the open position.

The method of flowchart 900 allows the UPS system to be more efficient when providing backup power to the DC bus by only dissipating power in the diode for a short period of time while the controller determines the diode has become forward biased. Additionally, a diode with a lower wattage rating may be used than if the by-pass relay was not used.

Figure 10:
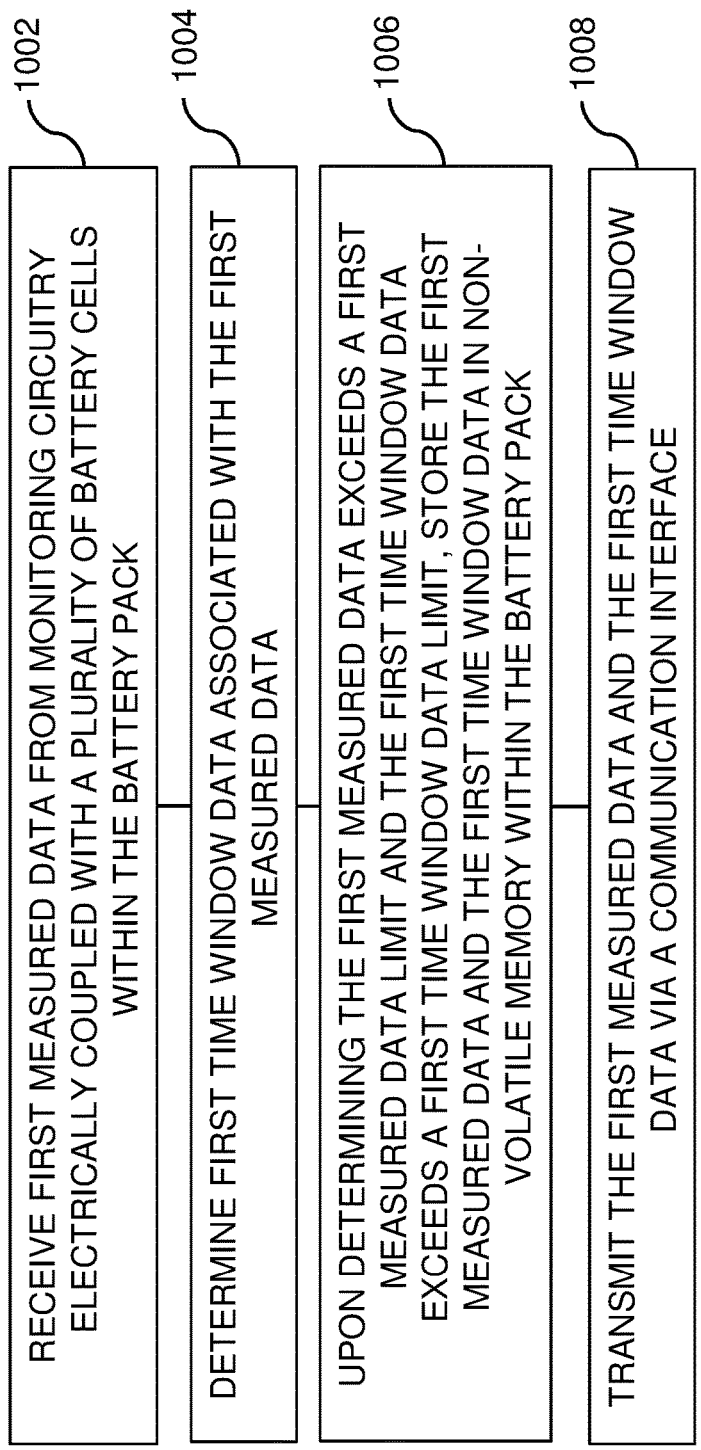
FIG. 10 depicts a flowchart illustrating a method implemented by a controller within a battery pack in accordance with embodiments of the present disclosure.

FIG. 10 depicts a flowchart 1000 illustrating a method implemented by a controller within a battery pack in accordance with embodiments of the present disclosure. The battery pack may be similar to the battery pack 302 of FIG. 3 and FIG. 4. For example, the battery pack may be a field replaceable battery pack for a UPS system.

In step 1002, the method includes receiving first measured data from monitoring circuitry electrically coupled with a plurality of battery cells within the battery pack. The first measured data may include temperature data, vibration data, charge current data, discharge current data, float voltage data, ohmic data measured at a plurality of frequencies, and/or the like.

In step 1002, the method further includes determining first time window data associated with the first measured data.

Figure 11:
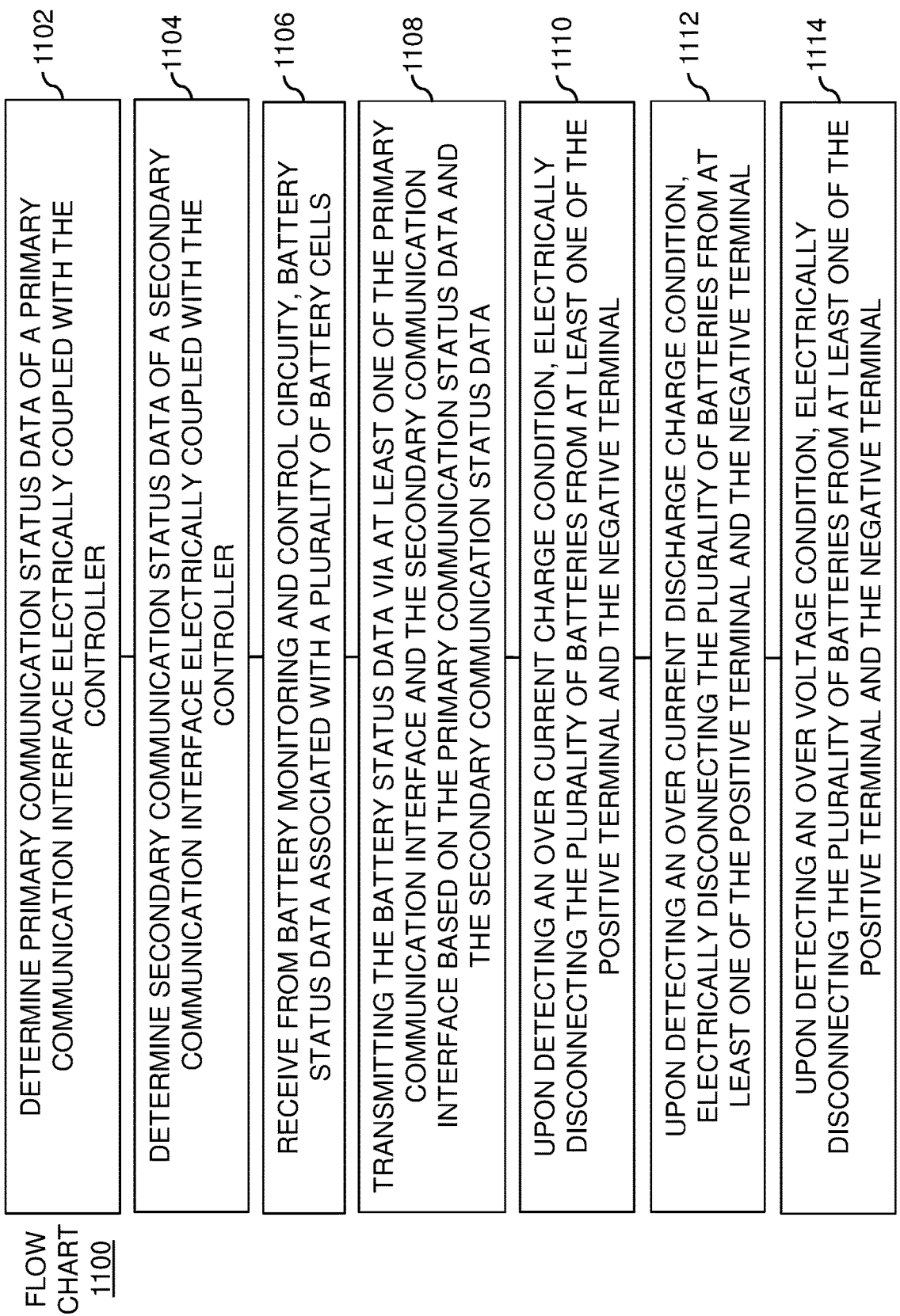
FIG. 11 depicts a flowchart illustrating a method implemented by a controller within a battery pack in accordance with embodiments of the present disclosure.

In step 1003, the method further includes upon determining the first measured data exceeds a first measured data limit and the first time window data exceeds a first time window data limit, storing the first measured data and the first time window data in non-volatile memory within the battery pack. For example, the first measured data limit and the first time window data limit may be associated with a warranty violation, a SOC, and/or a SOH for the battery pack, and/or the like In step 1004, the method further includes transmitting the first measured data and the first time window data via a communication interface. The communication interface may be a personal area network (PAN) communication interface, a local area network (LAN) interface, a wide area network (WAN) interface, or the like FIG. 11 depicts a flowchart 1100 illustrating a method implemented by a controller within a battery pack in accordance with embodiments of the present disclosure. The battery pack may be similar to the battery pack 302 of FIG. 3 and FIG. 4. For example, the battery pack may be a field replaceable battery pack for a UPS system.

In step 1102, the method includes determining primary communication status data of a primary communication interface electrically coupled with the controller.

In step 1104, the method further includes determining secondary communication status data of a secondary communication interface electrically coupled with the controller.

In step 1106, the method further includes receiving from battery monitoring and control circuitry, battery status data associated with a plurality of battery cells.

In step 1108, the method further includes transmitting the battery status data via at least one of the primary communication interface and the secondary communication interface based on the primary communication status data and the secondary communication status data.

In step 1110, the method further includes upon detecting an over current charge condition, electrically disconnecting the plurality of battery cells from at least one of a positive terminal and a negative terminal of the battery pack.

In step 1112, the method further includes upon detecting an over current discharge condition, electrically disconnecting the plurality of battery cells from at least one of the positive terminal and the negative terminal of the battery pack.

In step 1114, the method further includes upon detecting an over voltage condition, electrically disconnecting the plurality of battery cells from at least one of the positive terminal and the negative terminal of the battery pack FIG. 12 depicts a flowchart 1200 illustrating a method implemented by a controller within a battery pack in accordance with embodiments of the present disclosure. The battery pack may be similar to the battery pack 302 of FIG. 3 and FIG. 4. For example, the battery pack may be a field replaceable battery pack for a UPS system. In certain embodiments, the battery pack includes (1) a plurality of battery cells electrically coupled between a positive terminal and a negative terminal; (2) monitoring and control circuitry electrically coupled with the plurality of battery cells; (3) a controller electrically coupled with the monitoring and control circuitry; (4) a communication interface electrically coupled with the controller; (5) a user interface electrically coupled with the controller; and (6) a non-volatile memory electrically coupled with the controller. The monitoring and control circuitry includes a plurality of integrated shunt resistors and a plurality of integrated load circuits electrically coupled with the plurality of battery cells. The monitoring and control circuitry is configured for determining an SOC for each battery cell of the plurality of battery cells and for discharging each battery cell to a predetermined SOC.

In step 1202, the method includes receiving a discharge command from either the communication interface or the user interface In step 1204, the method further includes activating the plurality of integrated load circuits and discharging each battery cell of the plurality of battery cells to a reduced SOC charge In step 1206, the method further includes measuring a cell voltage across each battery cell of the plurality of battery cells In step 1208, the method further includes measuring a shunt voltage across each shunt resistor of each battery cell of the plurality of battery cells.

In step 1210, the method further includes determining a current SOC for each battery cell based on at least one of the cell voltage for each battery cell and the shunt voltage for each battery cell.

In step 1212, the method further includes determining a current SOC of the plurality of battery cells on a periodic interval; and upon determining the current SOC, storing the current SOC and a timestamp in the non-volatile memory. In certain embodiments, the period interval is a least one of an hourly interval, a daily interval, a weekly interval, a monthly interval, and/or the like.

The method of flowchart 1200 allows for self-discharging of a battery pack to an SOC appropriate for shipping and monitoring the status of the battery pack during shipping and storage for historical analysis. The integrated shunt and load control circuits allow the battery pack to automatically measure the SOC. Additionally, applying a load ensures optimal discharging and battery cell balancing until each battery cell in the battery pack reaches its targeted discharge level.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. For example, programming languages may include, but are not limited to: Ruby, JavaScript, Java, Python, Ruby, PHP, C, C++, C#, Objective-C, Go, Scala, Swift, Kotlin, OCaml, or the like.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A uninterruptible power supply (UPS) system comprising:
    an alternating current (AC) to direct current (DC) rectifier configured to be electrically coupled with an AC source;
    a DC to AC inverter configured to be electrically coupled with an AC load;
    a DC bus electrically coupled between the AC to DC rectifier and the DC to AC inverter;

a diode electrically coupled between the DC bus and a first battery cell of a plurality of lithium-ion battery cells;
a by-pass relay having a first terminal electrically coupled with an anode of the diode and a second terminal electrically coupled with a cathode of the diode;
a lithium-ion battery charger and a charge enable relay coupled in series across the cathode of the diode and the anode of the diode; and
a controller configured for:
determining a forward bias condition of the diode;
transitioning the by-pass relay from an open position to a closed position; and
activating the charge enable relay based on a state-of-charge (SOC) of the plurality of lithium-ion battery cells and a voltage measured on the DC bus.

2. The UPS system of claim 1, wherein determining the forward bias condition of the diode is based on determining a current flow between the plurality of lithium-ion battery cells and the DC bus indicates charge is being drained from the lithium-ion plurality of battery cells.

3. The UPS system of claim 2, wherein the controller is further configured for:
determining the current flow from the plurality of lithium-ion battery cells to the DC bus indicates negligible charge is being drained from the plurality of lithium-ion battery cells; and
transitioning the by-pass relay from the closed position to the open position.

4. The UPS system of claim 3, further comprising a resistor electrically coupled between the DC bus and the plurality of lithium-ion battery cells and determining the current flow is based on a voltage measured across the resistor.

5. The UPS system of claim 1, wherein the by-pass relay is an electromechanical relay.

6. The UPS system of claim 1 further comprising battery cell test circuitry electrically coupled with the controller, wherein the battery cell test circuitry is configured for determining the SOC and a state-of-health of the plurality of lithium-ion battery cells.

7. The UPS system of claim 1 further comprising an indicator electrically coupled with the controller, wherein the indicator indicates at least one of a charging condition and a discharging condition of the plurality of lithium-ion battery cells.

8. A method implemented by a controller within an uninterruptible power supply (UPS) system, the method comprising:
determining a forward bias condition of a diode, wherein the diode is coupled between a direct current (DC) bus and a plurality of lithium-ion battery cells;
transitioning a by-pass relay from an open position to a closed position, wherein:
the by-pass relay has a first terminal electrically coupled with an anode of the diode and a second terminal electrically coupled with a cathode of the diode; and
the UPS system further comprises a lithium-ion battery charger and a charge enable relay coupled in series across the cathode of the diode and the anode of the diode;
and
activating the charge enable relay based on a state-of-charge (SOC) of the plurality of lithium-ion battery cells and a voltage measured on the DC bus.

9. The method of claim 8, wherein determining the forward bias condition of the diode is based on determining a current flow between the plurality of lithium-ion battery cells and the DC bus indicates charge is being drained from the plurality of lithium-ion battery cells.

10. The method of claim 9, wherein the UPS system further comprises a resistor electrically coupled between the DC bus and the plurality of lithium-ion battery cells, and determining the current flow is based on a voltage measured across the resistor.

11. The method of claim 10 further comprising:
determining the current flow from the plurality of lithium-ion battery cells to the DC bus indicates negligible charge is being drained from the plurality of lithium-ion battery cells; and
transitioning the by-pass relay from the closed position to the open position.

12. The method of claim 8, wherein the by-pass relay is an electromechanical relay.

13. The method of claim 8, wherein the UPS further comprises:
an alternating current (AC) to DC rectifier configured to be electrically coupled with an AC source; and
a DC to AC inverter configured to be electrically coupled with an AC load, wherein the DC bus is electrically coupled between the AC to DC rectifier and the DC to AC inverter.

14. The method of claim 8, wherein the UPS system further comprises an indicator electrically coupled with the controller, wherein the method further includes changing a state of the indicator based on the plurality of lithium-ion battery cells changing from a charging condition to a discharging condition.

15. A non-transitory computer-readable storage medium, the non-transitory computer-readable storage medium storing instructions to be implemented on a controller within an uninterruptible power supply (UPS) system, the instructions when executed by the controller provide a method for:
determining a forward bias condition of a diode, wherein the diode is couple between a direct current (DC) bus and a plurality of lithium-ion battery cells;
transitioning a by-pass relay from an open position to a closed position, wherein:
the by-pass relay has a first terminal electrically coupled with an anode of the diode and a second terminal electrically coupled with a cathode of the diode; and
the UPS system further comprises a lithium-ion battery charger and a charge enable relay coupled in series across the cathode of the diode and the anode of the diode; and
activating the charge enable relay based on a state-of-charge (SOC) of the plurality of lithium-ion battery cells and a voltage measured on the DC bus.

16. The UPS system of claim 3 further comprising a current sensor electrically coupled with the controller and the controller is further configured for determining the current flow using the current sensor.

* * * * *